April 20, 1954  J. PASQUALE  2,675,852
METHOD AND MACHINE FOR LAMINATING PLASTIC
Filed June 5, 1953  3 Sheets-Sheet 1

John Pasquale
INVENTOR.

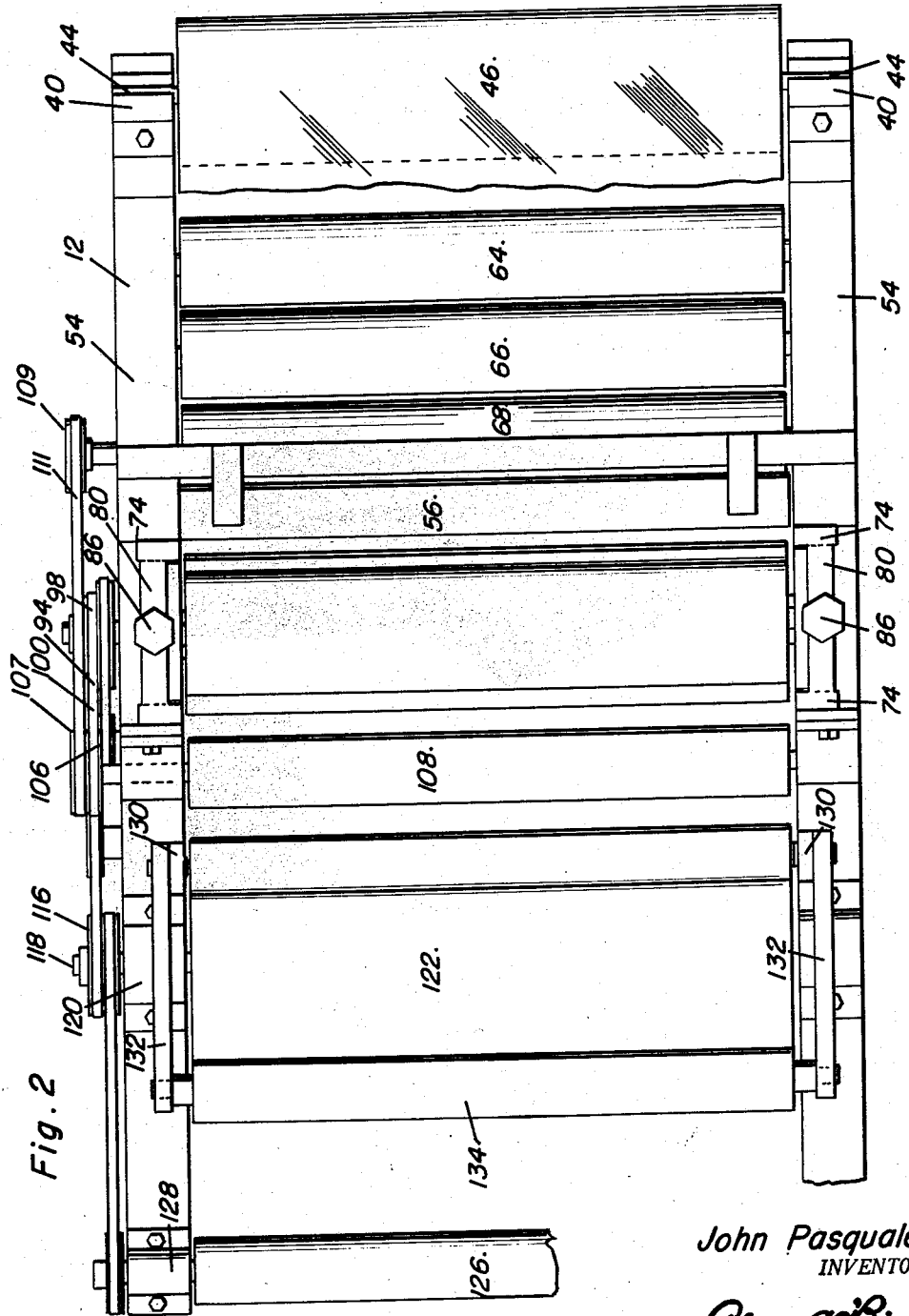

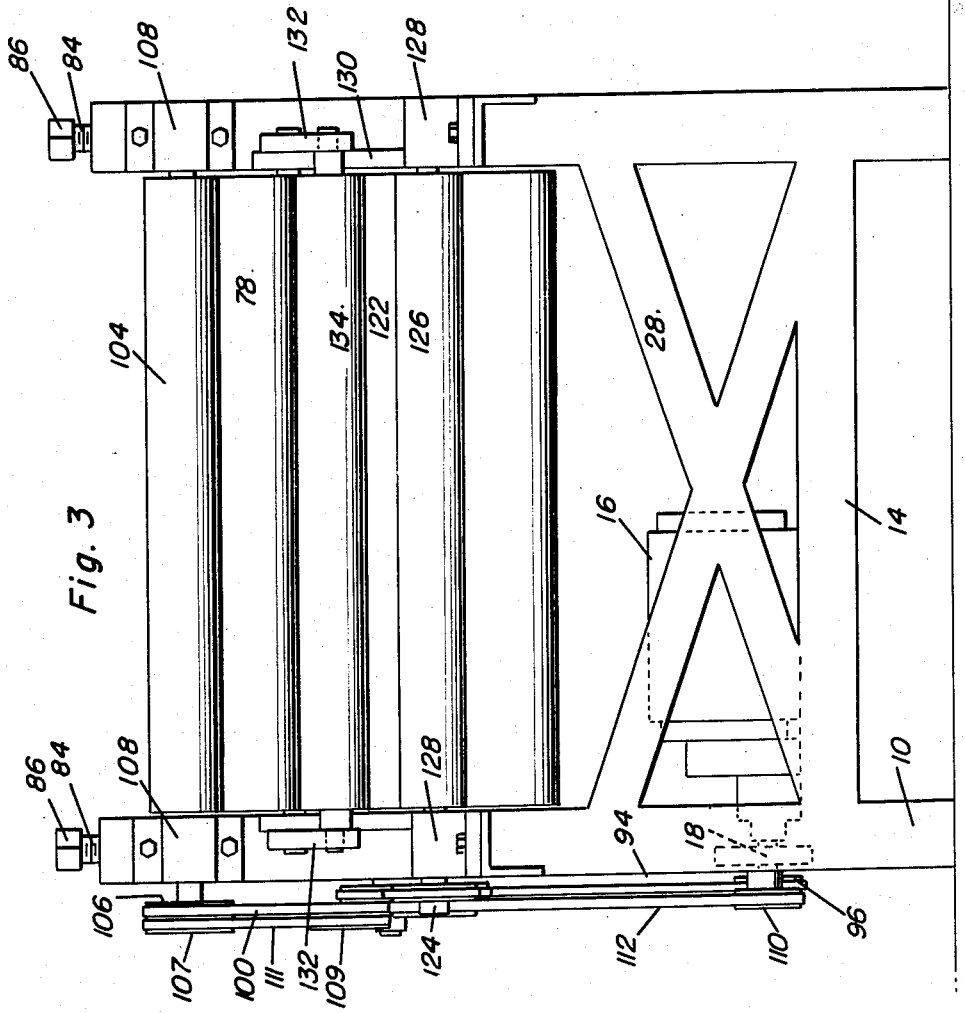

Patented Apr. 20, 1954

2,675,852

UNITED STATES PATENT OFFICE 2,675,852

METHOD AND MACHINE FOR LAMINATING PLASTIC

John Pasquale, Paterson, N. J., assignor to Liberty Machine Company, Inc., Paterson, N. J., a corporation of New Jersey Application June 5, 1953, Serial No. 359,876

12 Claims. (Cl. 154—1)

1

This invention relates to a method and to an apparatus for embossing and laminating a continuous strip of thermoplastic film to another strip of film and further includes the concept of the lamination and embossing of a continuous strip of plastic film to paper or cloth.

Unsupported vinyl resin film has to be polished while being manufactured or alternatively a separate machine must be constructed to enable the vinyl resin film to be polished. Inasmuch as any machine capable of performing this function is quite large and costly, and since the film could be printed on one side thereof and then polished, a product of relatively low durability could only be produced by these prior art devices. After a short time both the polish and print would wear off the film due to usage. The construction of the present invention provides means for taking a printed film and laminating it to another continuous strip of film. The machine further is capable of polishing the upper or clear surface of the printed film while positioning the print between two strips of film where no matter how much usage the strips are put to the print can never wear off due to the fact that it is sealed. Further, this invention provides means for embossing the surface of a strip of film if such is desired.

Other objects and features of the invention reside in the provision of an embossing and laminating machine that is strong and durable, comparatively simple in construction and operation, capable of being properly operated by but two men and in a manner desired to enable the production of a superior finished product at no greater cost.

These, together with the various ancillary objects and features of the invention which will become apparent as the following description proceeds, are attained by this method and means for laminating and embossing thermoplastic film, a preferred embodiment of the machine being shown in the accompanying drawings, by way of example only, wherein:

Figure 2 is a top plan view illustrating the relative arrangement of the rollers which comprise important elements of the invention; and Figure 3 is an end elevational view of this apparatus.

Figure 1:
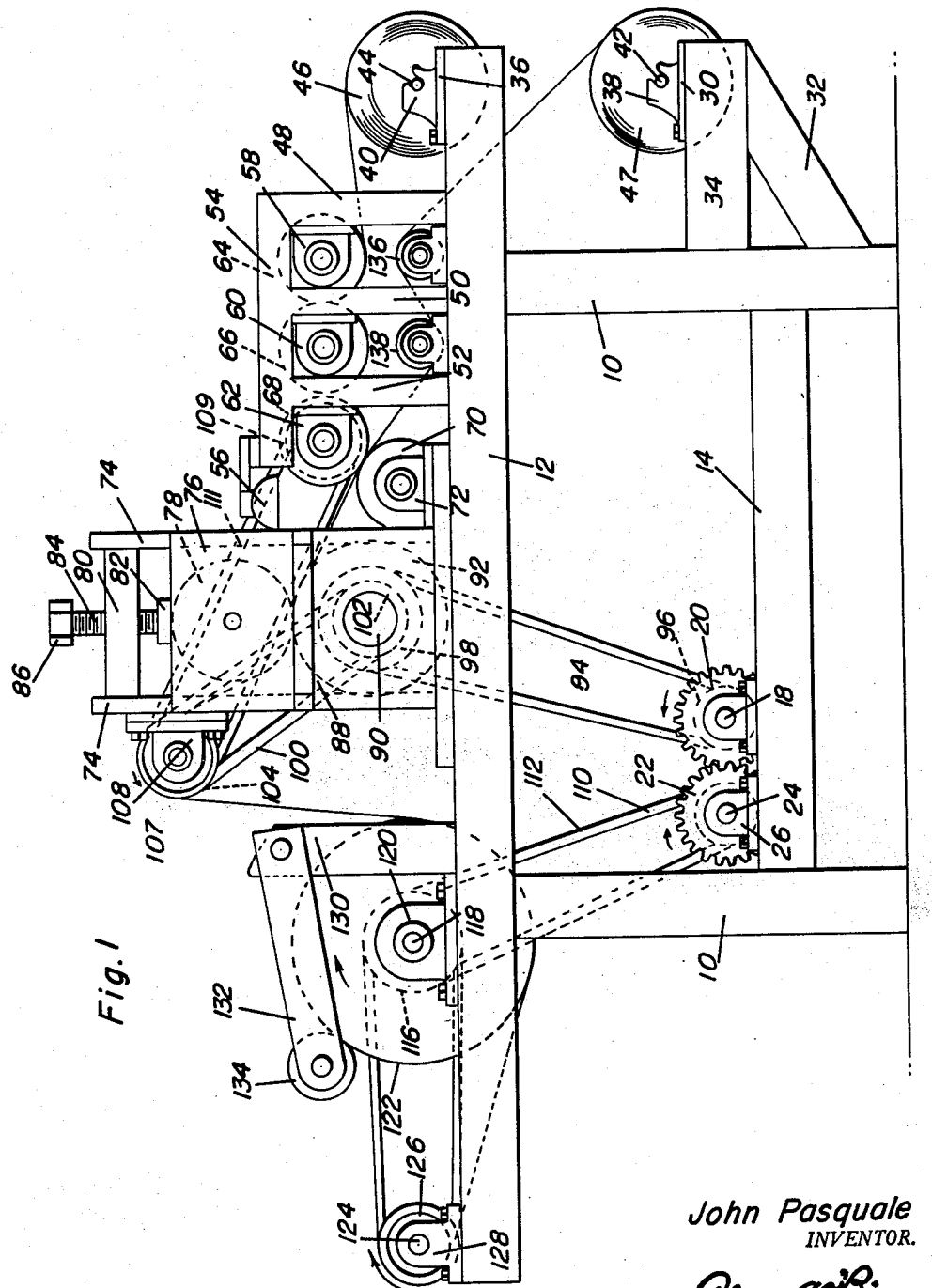
Figure 1 is a side elevational view of the apparatus comprising the present invention.

With continuing reference to the accompanying drawings wherein like reference numerals designate similar parts throughout the various views, reference numeral 10 generally designates

2 supporting legs forming a part of the framework of this invention. The legs 10 support a substantially rectangular frame 12. Extending between the legs 10, are base members 14, on which a drive motor 16 is mounted. The motor 16 drives a shaft 18 on which a gear 20 is secured. The gear 20 intermeshes with a gear 22 mounted on a stub shaft 24 and journaled in a bearing block 26 mounted on the base 14. Suitable braces 28 are provided for rigidifying the structure and a platform 30 supported by braces 32 and horizontally extending members 34 forms part of the frame work. It is to be understood that the frame members may readily be constructed from angle iron or other similar construction elements.

Supported on the platform 30 and on a platform 36 superimposed over the platform 30 are pairs of bearing supports 38 and 40, respectively, which are adapted to support the shafts 42 and 44 of feed rollers on which rolls 46 and 47 of continuous strips of plastic film are wound. Mounted on the rectangular horizontal frame 12 are spaced pairs of vertically extending members 48, 50 and 52, which are joined by longitudinally extending members 54. The longitudinally extending members 54 overhang the vertical members 52 and have attached thereto a comparatively strong radiant heater 56. Supported by the vertical members 48, 50 and 52 are bearing blocks 58, 60 and 62 which provide means for journalling rollers 64, 66 and 68. The rollers 64, 66 and 68 are steel rollers each containing a rheostatically controlled electric heater. Another roller 70 journalled in bearing blocks 72 and supported by the rectangular frame 12 is of similar construction to the rolls 64, 66 and 68 and is likewise a heated roller.

Spaced pairs of vertically extending members 74 are supported by the rectangular frame 12. The vertical members 74 are in fact vertical guides for support of carriages 76. Extending between the carriages 76 and journalled therein is an embossing roller 78. Extending between the vertical guides 74 are transverse members 80. Secured in bosses 82 mounted on the vertically movable carriages 76 are threaded adjusting members 84 which are threadedly engaged in the transverse members 80 thereby permitting the position of the rollers 78 to be adjusted determined by rotation of the head 86 of the threaded adjusting member 84.

Mounted in the side plates 88 affixed to the vertical members 74 are bearing supports for the shaft 90 of a cushion roller 92 having a covering of "neoprene" or suitable natural or synthetic rubber-like material. The cushion roller 92 is driven by means of an endless belt 94 connected to the pulley wheel 96 mounted on the shaft 18. The belt 94 is entrained about a pulley wheel 98 mounted on the shaft 90. Hence, the motor 18 will rotate the cushion roller 92. An endless belt 100 is entrained about a pulley wheel 102 mounted on the shaft 90 and further entrained about a pulley wheel 104 for driving a small cooling drum 106 mounted in bearing blocks 108 attached to the vertical members 74. The roller 68 is driven by means of pulley wheels 107, 109 and belt 111.

The shaft 24 has a pulley wheel 110 attached thereto about which an endless belt 112 is entrained. The endless belt is also entrained about a pulley wheel 116 mounted on a shaft 118 carried by bearing blocks 120 which are supported on the rectangular frame 12. The shaft 118 has mounted thereon a cooling drum 122 of comparatively large size. Another pulley wheel is mounted on the shaft 118 for driving the shaft 124 on which a winding reel 126 is mounted. The shaft 124 is journalled in bearing supports 128 carried by the rectangular frame 12. There is secured to the frame 12 standards 130 which have rotatably secured thereto arms 132 carrying an idler roller 134. The idler roller is used only when the laminated strip is too short to be properly wound on the winding drum or reel 126.

In operation and with upper and lower reels 46 and 47 of thermoplastic film such as a vinyl resin mounted in the bearing supports 38 and 40 the machine is ready for operation. Rollers 64, 66, 68 and 70 are heated by the internal heaters carried therein. The lower strip will be carried past the idler rollers 136 and 138 mounted on the frame 12 and into engagement with the heated roller 70. The upper strip of film will be entrained about the rollers 64, 66 and 68 so as to effectively heat both sides of the strip. After this preheating by engagement with the rollers the heat emanating from the radiant heating element 56 will be of such amount as to permit the embossing roller 78 to cause the strips to become intimately bonded when pressure is applied on the cushion roller 92. It is to be noted that the embossing roller may be provided with a suitable decorative design so that the upper strip of film will be subjected to uneven amounts of pressure thus cutting and embossing the upper surface thereof. After passing through the rollers 78 and 92 the composite laminated strip of film is passed about the roller 106 for initial cooling and then about the roller for cooling drum 122. Thence, it is wound upon the reel 126.

It is to be noted that in lieu of an embossing roller 78 having a design engraved thereon for embossing a high finish for the express purpose of polishing the strip may be provided. Further, there may be provided a matte roller for dulling the top surface whenever such a type of finished product is desired.

Since from the foregoing, the construction and advantages of this method and machine for laminating plastic are readily apparent, further description is believed to be unnecessary.

However, since numerous modifications will readily occur to those skilled in the art after a consideration of the foregoing specification and accompanying drawings, it is not intended to limit the invention to the precise embodiment shown and described, but all suitable modifications and equivalents may be readily resorted to as desired.

What is claimed as new is as follows:

1. A method of embossing an upper strip of thermoplastic film and laminating said upper film to a lower strip of thermoplastic film comprising the steps of intimately engaging both sides of said upper film with a series of heated members, simultaneously passing said upper film and said lower film through a zone of radiant heat, simultaneously squeezing said upper film against said lower film to bond said upper film to said lower film without the use of an adhesive while applying irregular amounts of pressure on the surface of said upper film to emboss said upper film, and then cooling said laminated film.

2. A method of laminating an upper strip of thermoplastic film to a lower strip of thermoplastic film comprising the steps of intimately engaging both sides of said upper film with a series of heated members, simultaneously passing said upper film and said lower film through a zone of radiant heat, squeezing said upper film against said lower film to bond said upper film to said lower film without the use of an adhesive, and then cooling said laminated film.

3. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminated continuous strips into a roll carried by said frame.

4. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminating continuous strips into a roll carried by said frame, said heated rollers being hollow in construction and having electrical heating elements positioned therein.

5. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminated continuous strips into a roll carried by said frame, and means for controlling the heat output of said means for radiating heat.

6. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminated continuous strips into a roll carried by said frame, and means on said frame for supporting rolls of continuous strips of thermoplastic film.

7. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminated continuous strips into a roll carried by said frame, said means for adjustably urging said embossing roller against said cushion comprising spaced pairs of vertical guides secured to said frame, said pairs of guides supporting transverse members, a pair of vertically movable carriages, each of said carriages engaging a pair of guides, said embossing roller being mounted on a shaft journaled in said carriages, and screw adjusting members threadedly engaged in said transverse members and secured to said carriages.

8. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminated continuous strips into a roll carried by said frame, said means for adjustably urging said embossing roller against said cushion comprising spaced pairs of vertical guides secured to said frame, said pairs of guides supporting transverse members, a pair of vertically movable carriages, each of said carriages engaging a pair of guides, said embossing roller being mounted on a shaft journaled in said carriages, and screw adjusting members threadedly engaged in said transverse members and secured to said carriages, said heated rollers being hollow in construction and having electrical heating elements positioned therein.

9. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminated continuous strips into a roll carried by said frame, said means for adjustably urging said embossing roller against said cushion comprising spaced pairs of vertical guides secured to said frame, said pairs of guides supporting transverse members, a pair of vertically movable carriages, each of said carriages engaging a pair of guides, said embossing roller being mounted on a shaft journaled in said carriages, and screw adjusting members threadedly engaged in said transverse members and secured to said carriages, and means for controlling the heat output of said means for radiating heat.

10. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminated continuous strips into a roll carried by said frame, said means for adjustably urging said embossing roller against said cushion comprising spaced pairs of vertical guides secured to said frame, said pairs of guides supporting transverse members, a pair of vertically movable carriages, each of said carriages engaging a pair of guides, said embossing roller being mounted on a shaft journaled in said carriages, and screw adjusting members threadedly engaged in said transverse members and secured to said carriages, and means on said frame for supporting rolls of continuous strips of thermoplastic film.

11. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminated continuous strips into a roll carried by said frame, said means for adjustably urging said embossing roller against said cushion comprising spaced pairs of vertical guides secured to said frame, said pairs of guides supporting transverse members, a pair of vertically movable carriages, each of said carriages engaging a pair of guides, said embossing roller being mounted on a shaft journalled in said carriages, and screw adjusting members threadedly engaged in said transverse members and secured to said carriages, said heated rollers being hollow in construction and having electrical heating elements positioned therein, and means for controlling the heat output of said means for radiating heat.

12. A machine for embossing and laminating continuous strips of thermoplastic film comprising a frame, a set of heated rollers mounted on said frame work in spaced relationship and adapted to heat both sides of a strip of film entrained thereabout, means for radiating heat positioned immediately adjacent said rollers, a cushion roller having a resilient covering mounted on said frame, means for rotating said cushion roller, an embossing roller carried by said frame, means for adjustably urging said embossing roller against said cushion roller, cooling drums on said frame, and means for winding said laminated continuous strips into a roll carried by said frame, said means for adjustably urging said embossing roller against said cushion comprising spaced pairs of vertical guides secured to said frame, said pairs of guides supporting transverse members, a pair of vertically movable carriages, each of said carriages engaging a pair of guides, said embossing roller being mounted on a shaft journalled in said carriages, and screw adjusting members threadedly engaged in said transverse members and secured to said carriages, said heated rollers being hollow in construction and having electrical heating elements positioned therein, and means for controlling the heat output of said means for radiating heat, and means on said frame for supporting rolls of continuous strips of thermoplastic film.

References Cited in the file of this patent

UNITED STATES PATENTS

| Number | Name | Date |
|---|---|---|
| 2,154,474 | Scott | Apr. 18, 1939 |
| 2,410,361 | Prance | Oct. 29, 1946 |
| 2,446,771 | Knowland | Aug. 10, 1948 |
| 2,585,915 | Chavannes | Feb. 19, 1952 |
| 2,633,442 | Caldwell | Mar. 31, 1953 |